(12) United States Patent
Nakamura

(10) Patent No.: US 7,719,221 B2
(45) Date of Patent: May 18, 2010

(54) SERVO CONTROL APPARATUS

(75) Inventor: Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 333 days.

(21) Appl. No.: 11/847,497

(22) Filed: Aug. 30, 2007

(65) Prior Publication Data

US 2008/0054834 A1   Mar. 6, 2008

(30) Foreign Application Priority Data

Aug. 31, 2006  (JP) .......................... P2006-236582

(51) Int. Cl.
*G05B 11/01* (2006.01)
(52) U.S. Cl. .............. 318/560; 318/568.16; 318/568.22; 318/632
(58) Field of Classification Search .................. 318/560, 318/568.16, 568.18, 568.22, 615, 632
See application file for complete search history.

(56) References Cited

U.S. PATENT DOCUMENTS

| | | | | |
|---|---|---|---|---|
| 4,345,194 A | * | 8/1982 | Green | 318/621 |
| 5,091,684 A | * | 2/1992 | Iwashita | 318/616 |
| 5,115,418 A | * | 5/1992 | Shimada | 318/616 |
| 5,210,476 A | * | 5/1993 | Kazato | 318/560 |
| 5,598,077 A | * | 1/1997 | Matsubara et al. | 318/568.22 |

FOREIGN PATENT DOCUMENTS

| | | |
|---|---|---|
| JP | 07-110717 | 4/1995 |
| JP | 08331881 | 12/1996 |
| JP | 09-121580 | 5/1997 |
| JP | 09-196781 | 7/1997 |
| JP | 09-231701 | 9/1997 |
| JP | 09-265748 | 10/1997 |
| JP | 10-264057 | 10/1998 |
| JP | 11-031014 | 2/1999 |
| JP | 2001-051721 | 2/2001 |
| JP | 2001-105358 | 4/2001 |
| JP | 2001-255904 | 9/2001 |
| JP | 2003-131705 | 5/2003 |

(Continued)

OTHER PUBLICATIONS

Japanese Office Action dated May 20, 2008 corresponding to U.S. Appl. No. 11/847,497, filed Aug. 30, 2007.

(Continued)

*Primary Examiner*—Walter Benson
*Assistant Examiner*—Thai Dinh
(74) *Attorney, Agent, or Firm*—Turocy & Watson, LLP

(57) ABSTRACT

A servo control apparatus includes a motor including a motor shaft, the motor for driving a drive subject; a detecting section that detects a rotation position of the motor shaft; and a control system configured to generate a motor torque command for the motor using the rotation position. The control system includes an observer configured to estimate friction torque occurring in the vicinity of the motor shaft on the basis of the rotation position and an application voltage to the motor. The observer is configured to generate a compensation voltage to be added to the application voltage on the basis of the friction torque.

12 Claims, 4 Drawing Sheets

FOREIGN PATENT DOCUMENTS

| | | |
|---|---|---|
| JP | 2004199495 | 7/2004 |
| JP | 2004-280565 | 10/2004 |
| JP | 2005267296 | 9/2005 |
| JP | 2005-317128 | 11/2005 |

OTHER PUBLICATIONS

Japanese Office Action mailed on Aug. 26, 2008 corresponding to U.S. Appl. No. 11/847,497, filed Aug. 30, 2007.

Parameter Estimation of Vehicle System Based on the Disturbance Observer R&D Review of Toyoda CRDL vol. 29 No. 4 (Dec. 1994) p. 23-32.

Control technology that is effective in servo system SANYO DENKI Technical Report No. 14 (Nov. 2002) p. 9-11.

* cited by examiner

SERVO CONTROL APPARATUS

The entire disclosure of Japanese Patent Application No. 2006-236582 filed on Aug. 31, 2006, including specification, claims, drawings and abstract is incorporated herein by reference in its entirety.

BACKGROUND OF THE INVENTION

1. Field of the Invention

The present invention relates to a servo control apparatus suitable for use in a shaft friction compensation technique for a positioning control that is performed in, for example, a situation that high friction torque acts on a drive shaft for rotating a load.

2. Background Art

In systems for tracking or monitoring a subject, the direction of a camera is caused to follow the subject by rotating a base to which the camera is fixed by motor driving. Where a follow-up system is used outdoors, to protect electronic devices etc., a sealing member for a dust-proof or drip-proof purpose is attached to the motor shaft. While the motor shaft is being rotated, the sealing member causes friction to act on the motor shaft. Therefore, positioning is performed about the rotation angle of the motor shaft, the positioning accuracy is lower than in a case that no sealing member is attached to the motor shaft.

If the follow-up system can measure the value of friction torque acting on the motor shaft, usually, rotation angle positioning is performed by using a control system which feeds back the error of the rotation angular position of the motor shaft from a target position. The motor shaft is squeezed with the sealing member to such an extent that its rotation is not hindered. And the motor shaft is not rotated and a positioning error occurs unless the controlled variable is fed back so that drive torque that is higher than measured friction torque is output. Since the motor does not start to rotate until drive torque that is higher than the friction torque is generated after issuance of an instruction to start a positioning control. This results in increase of the positioning settlement time. Therefore, in conventional follow-up systems, a control system is designed so that the friction effect is exercised by increasing the gain of a positioning control system taking a torque loss due to the friction by the sealing member into consideration.

Among conventional techniques is a servo technique which suppresses vibration of a load of a vibration-system mechanism using an observer for estimating disturbance acting on a motor (refer to JP-A-2004-199495, for example). Techniques for increasing the positioning accuracy have also been proposed in the following documents: (a) JP-A-2004-199495, (b) Koji Umeno: "Estimation of Vehicle State Quantity Based on Disturbance Observer," R & D Review of Toyota Central Research and Development Laboratories, Inc., Vol. 29, No. 4, December 1994, and (c) Yuji Ide et al.: "Control Technologies Effective in Servo Systems," Sanyo Denki Technical Report, No. 14, November 2002.

However, in design methods using the conventional techniques, it is difficult to effectively suppress shaft friction on a motor shaft because the rigidity of the motor shaft that is attached to a load has a limit and hence a shaft resonance characteristic prevents the gain of a control system from being increased sufficiently. On the other hand, it is difficult for design methods with high rigidity of the motor shaft to reduce the size and weight of a follow-up system.

Designs are possible that utilize a method of detecting a quantity reflecting influence of friction by introducing an additional sensor such as a torque sensor and adding, to a positioning control system, a feedback control loop for feeding back this quantity. However, the introduction of the additional sensor not only increases the cost of the follow-up system but also makes it necessary to adjust the control system for sensor-dependent variation. The system is thus rendered complex.

In addition, the state of the sealing surface varies as the sealing member slidingly contacts the motor shaft repeatedly and such variation with age may increase the friction. As such, follow-up systems using a sealing member may be deteriorated rapidly in performance.

The present invention therefore provides a servo control apparatus capable of compensation control for suppressing shaft friction on a motor shaft in a situation that the motor shaft has a certain resonance characteristic.

SUMMARY OF THE INVENTION

According to one embodiment of the invention, a motor, receiving an application voltage to drive a drive subject, the motor including a motor shaft, the motor for driving a drive subject; a detecting section that detects a rotation position of the motor shaft; and a controller configured to control the motor; wherein the controller includes an observer configured to estimate friction torque occurring in the vicinity of the motor shaft on the basis of the rotation position and the application voltage; and the observer is configured to generate a compensation voltage to be added to the application voltage on the basis of the friction torque.

BRIEF DESCRIPTION OF THE DRAWINGS

Embodiments may be more readily described with reference to the accompanying drawings.

DETAILED DESCRIPTION OF THE EMBODIMENTS

Figure 1:
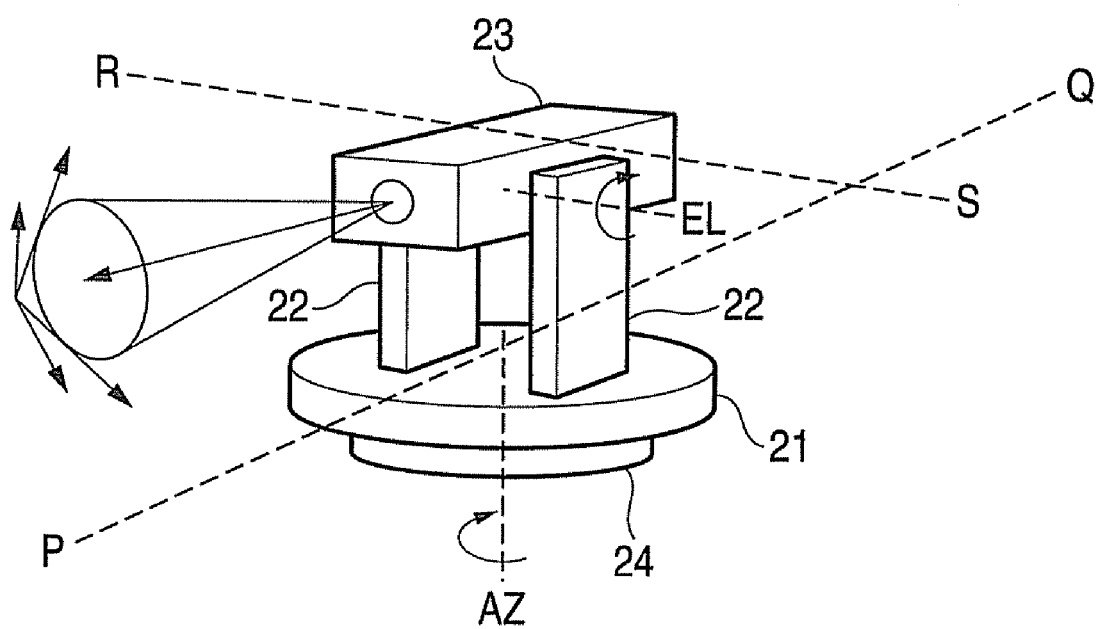
FIG. 1 shows an exemplary appearance of a follow-up camera system according to a first embodiment.

Servo control apparatus according to embodiments of the present invention will be hereinafter described with reference to the drawings. The same components are given the same reference symbol in the drawings and redundant descriptions will be avoided.

Embodiment 1

A servo control apparatus according to a first embodiment of the invention is applied to a follow-up camera system. As shown in FIG. 1, the follow-up camera system according to this embodiment is equipped with a base 24, an azimuth axis rotating unit (hereinafter referred to as "AZ rotating unit") 21, a pair of support members 22, and an elevation axis rotating unit (hereinafter referred to as "EL rotating unit") 23.

The AZ rotating unit 21 is for rotating the base 24 and has a shaft (not shown) as a motor shaft and a drive mechanism (not shown) for driving the shaft. The pair of support members 22 are fixed to and erect from the top surface of the AZ rotating member 21. The pair of support members 22 are rotatable about the center axis of the shaft.

The EL rotating unit 23 incorporates a camera inside, and both side surfaces of the EL rotating unit 23 are bearing-received by the pair of support members 22 which erect from the AZ rotating unit 21. The EL rotating unit 23 also has, inside itself, a shaft as a motor shaft and a drive mechanism for driving the shaft and is configured so as to be rotatable about the center axis of the shaft.

Figure 2:
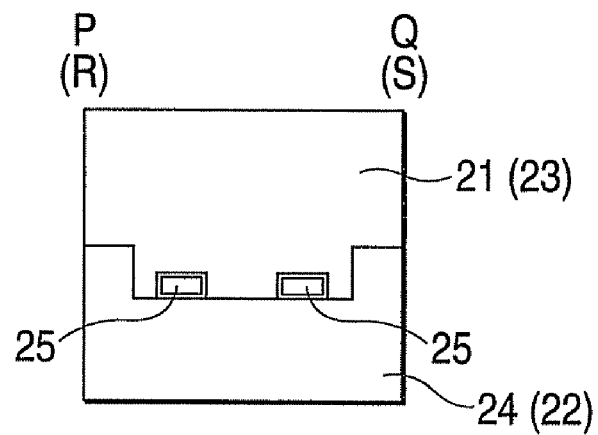
FIG. 2 is a schematic sectional view of a motor shaft according to the first embodiment.

FIG. 2 shows a schematic cross section taken along line PQ. A sealing member 25 for drip-proof, dust-proof, and anti-vibration purposes is attached to a link portion where the AZ rotating unit 21 is fitted in the base 24. The sealing member 25 is attached so as not to obstruct rotation of the motor shaft. As the motor is rotated, the sealing member 25 causes friction to act on the motor shaft, that is, frictional force acts on the shaft (motor shaft).

As also shown in FIG. 2 (a view taken along line RS), a sealing member 25 for causing frictional force is attached to the link portion where the EL rotating unit 23 is fitted in each support member 22 so as not to obstruct rotation of the motor shaft.

With the presence of the two drive mechanisms for the rotation about the AZ axis and the EL axis, the EL rotating unit 23 which is mounted with the camera is rotated about the EL axis and the AZ rotating unit 21 is rotated about the AZ axis. Therefore, the follow-up camera system according to the embodiment has a double-axis (EL axis and AZ axis) gimbal structure, which allows the line of sight of the camera to be moved so as to point a desired position.

Each of the EL rotating unit 23, the support member 22, the AZ rotating unit 21, and the base 24 may be covered with a transparent or semitransparent cover member. By virtue of the cover members and the sealing members 25, the camera and the electronic devices that are incorporated in the follow-up camera system according to the embodiment are prevented from being influenced by the environment and hence are protected even in the case where the system is installed outdoors.

In other words, the EL rotating unit 23 itself and the support members 22 are attached, as loads having inertia, to the shaft of the EL rotating unit 23. The base 24 is attached, as a load having inertia, to the shaft of the AZ rotating unit 21. As each shaft is swung or rotated, disturbance such as frictional force including that of shaft friction caused by the sealing member 25 and inertial force of the load acts on the shaft. The shaft friction is the main one occurring in the vicinity of the motor shaft among the disturbance elements. The servo control apparatus according to the embodiment calculates friction torque by multiplying frictional force around the AZ axis by a braking radius between the AZ axis and the point of application of the frictional force around the AZ axis. Likewise, the servo control apparatus according to the embodiment calculates friction torque by multiplying frictional force around the EL axis by a braking radius between the EL axis and the point of application of the frictional force around the EL axis.

Figure 3:
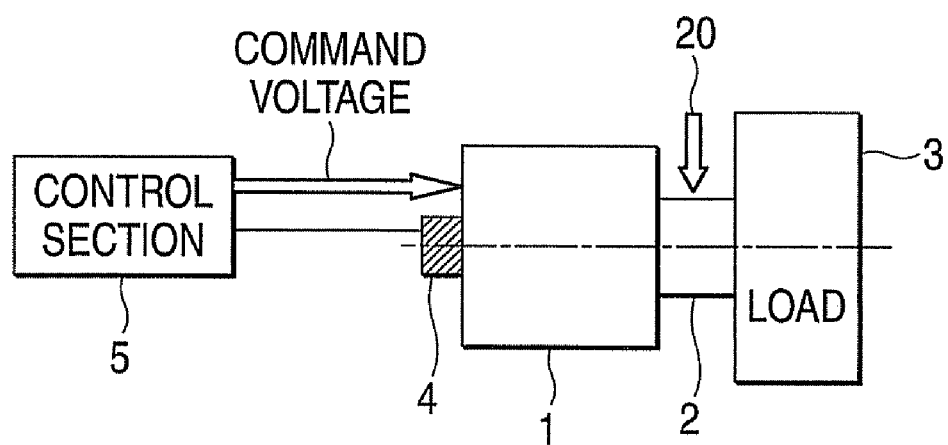
FIG. 3 shows an exemplary configuration of a servo control apparatus according to the first embodiment.

In a situation that high friction is acting on the shaft for rotating the load, the servo control apparatus according to the embodiment performs a positioning control using a friction estimation value obtained by an observer (e.g. a disturbance observer). As shown in FIG. 3, the servo control apparatus is equipped with a motor 1, a motor shaft 2, a load 3, a detector 4, and a control section 5. The motor 1 is for driving the load 3. The motor shaft 2, which connects the load 3 and the motor 1, corresponds to the shaft of the AZ axis or the EL axis. The motor shaft 2 has a resonance characteristic that originates from the shaft rigidity. A friction element 20 corresponds to the sealing member 25 and causes influence acting around the motor shaft 2.

The detector 4 is a rotation position detecting section for detecting a rotation position of the motor shaft 2 of the motor 1. The detector 4 is a rotation position detecting section detects a rotation angle of the motor shaft 2 as the rotation position. The detector 4 may be such as to detect an angular velocity of the motor shaft 2 (described later in a second embodiment).

The control system 5 is a control system for generating a motor torque command for the motor 1 on the basis of a target angle value and a rotation position. The control section 5 controls a command voltage in accordance with rotation position information detected by the detector 4 which is attached to the motor 1. The control section 5 outputs a shaft-friction-compensated voltage and the motor 1 drives the load 3 as a drive subject on the basis of the compensated voltage.

Figure 4:
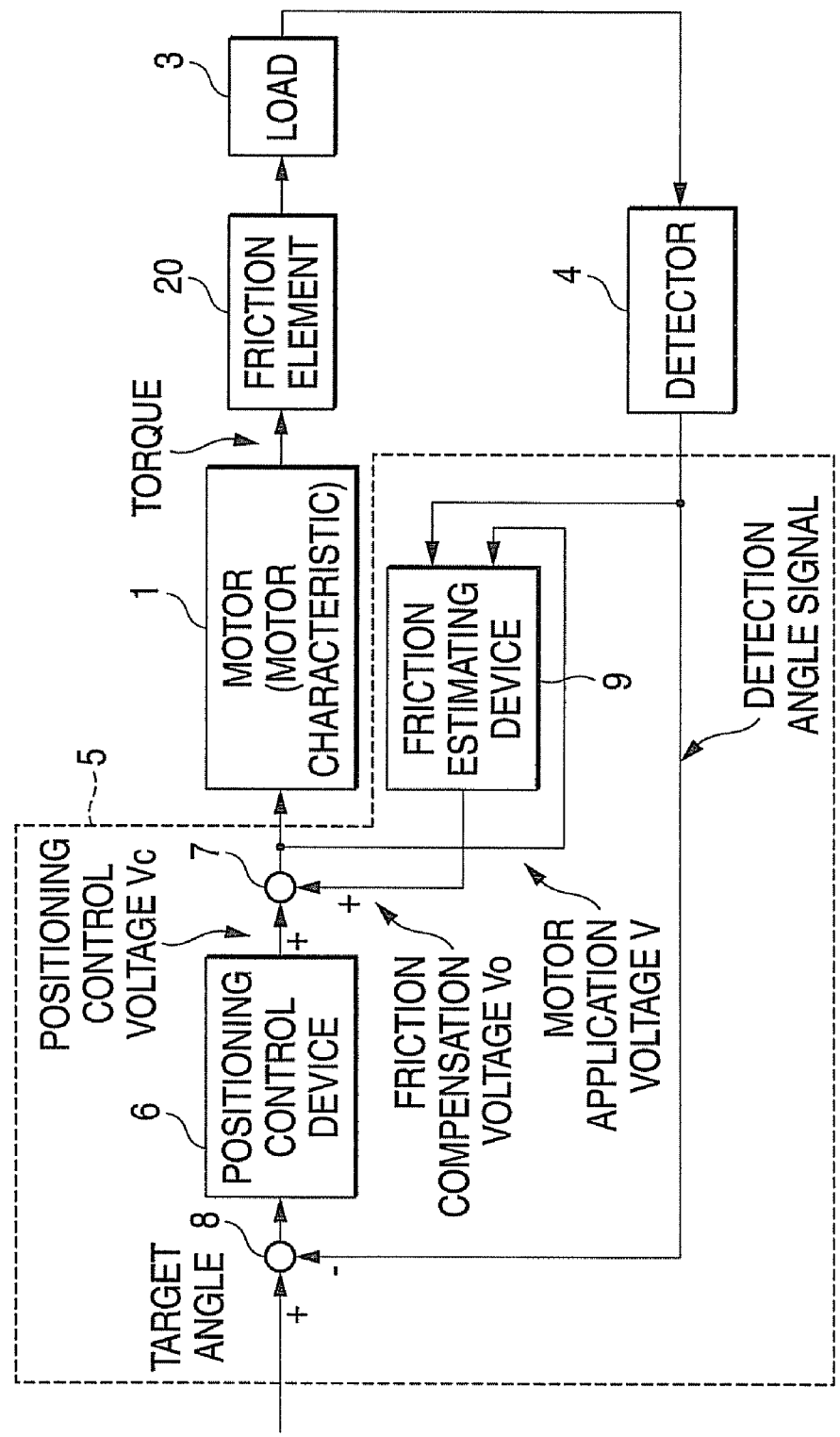
FIG. 4 illustrates a control section according to the first embodiment.

As shown in FIG. 4, the control section 5 is equipped with a control device 6 as an angle control section, an addition circuit 7, an arithmetic circuit 8, and a friction estimating device 9.

The control device 6 is for performing positioning about the rotation angle of the motor shaft 2. The control device 6 calculates a torque command (motor torque command) to be supplied to the motor 1 using an input command such as a target angle and a signal produced by the detector 4. The addition circuit 7, which is a voltage adder, adds a voltage as a compensation signal that is output from the friction estimating device 9 to a voltage as the torque command value that is output from the control device 6 and outputs a resulting addition voltage. The arithmetic circuit 8, which is a signal computing element, calculates the difference between the signal representing the target angle and the signal representing the detection angle that is output from the detector 4, and inputs the calculated difference to the control device 6.

The friction estimating device 9 according to the embodiment estimates friction torque occurring in the vicinity of the motor shaft 2 among disturbance elements on the basis of a rotation position and an application voltage to the motor 1 and generates a compensation voltage to be added to the application voltage on the basis of the estimated friction torque. As described later, the friction estimating device 9 has three disturbance observers each of which estimates torque as a state variable. The disturbance observers estimate friction torque, whereby the friction estimating device 9 estimates friction disturbance acting on the motor 1.

The input signals to the friction estimating device 9 (disturbance observers) are two signals, that is, a motor angle detection value and a motor application voltage. That is, the disturbance observers perform estimation on the basis of the two signals that are the motor angle and the motor application voltage. Therefore, the friction estimating device 9 according to the embodiment estimates a friction value (friction torque) on the basis of the two input signals (angle detection value θ and motor application voltage v) and outputs a friction compensation voltage $v_o$ on the basis of the estimated friction value. In this manner, the friction estimating device 9 estimates friction disturbance acting around the motor shaft 2 among friction disturbances and corrects the estimated friction value.

The motor 1, the detector 4, and the control device (angle control section) 6 constitute a positioning control loop. Therefore, the servo control apparatus according to the embodiment is provided with the positioning control loop and the friction estimating device 9. The control device 6 and the detector 4 constitute a control system for feeding back the difference between a target value and a detection angle.

With the above configuration, the friction estimating device 9 estimates a shaft friction value using a detection angle θ and a motor application voltage v and outputs a friction compensation voltage $v_o$ for compensating for the estimated friction value. The addition circuit 7 adds the friction compensation voltage $v_o$ which is output from the friction estimating device 9 to a positioning control voltage $v_c$ which is output from the control device 6, and applies a resulting motor application voltage v to the motor 1. Therefore, torque that is higher than friction torque is generated around the motor shaft 2 and the motor shaft 2 which is connected to the load 3 is driven by the torque thus generated. In this manner, the positioning control loop estimates and corrects a friction value and shaft friction is thus compensated for.

Figure 5:
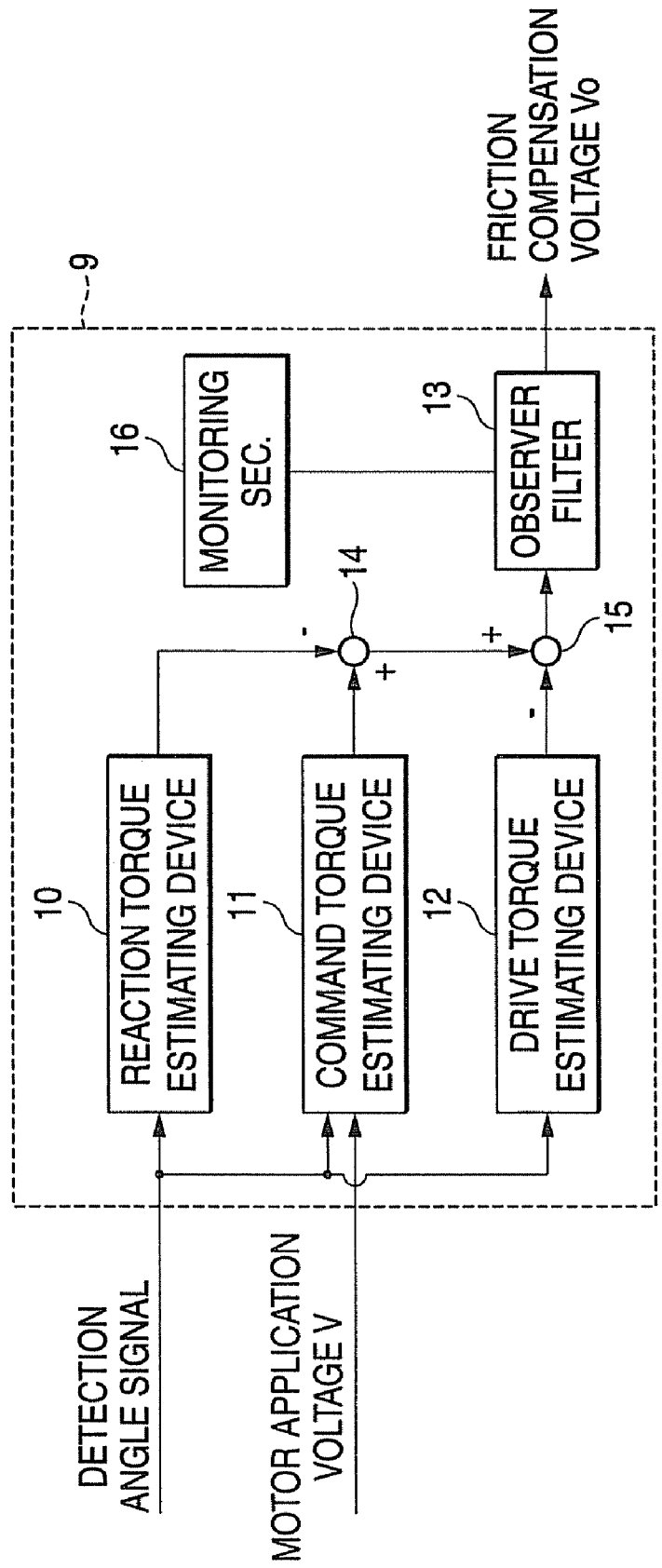
FIG. 5 shows an exemplary configuration of a friction estimating device according to the first embodiment of the invention.

The friction estimating device 9 will be described below in more detail. As shown in FIG. 5, the friction estimating device 9 is equipped with a reaction torque estimating device 10, an command torque estimating device 11, a drive torque estimating device 12, an observer filter 13, arithmetic elements 14 and 15, and a monitoring section 16. These functions are implemented by a CPU (central processing unit), a ROM, a RAM, an IC, an LSI, etc.

The reaction torque estimating device 10 is a device for estimating reaction torque that is exerted on the motor shaft 2 by the load 3 as a drive subject using a rotation position and the moment of inertia and the spring modulus of the load 3. The reaction torque estimating device 10 calculates and outputs a reaction torque estimation value of a rigid body system.

The command torque estimating device 11 is a device for estimating command torque generated around the motor shaft 2 using a rotation position, an application voltage, the torque constant, the winding resistance, and the counterelectromotive force constant of the motor 1. The command torque estimating device 11 calculates and outputs a generated torque estimation value of the motor 1.

The drive torque estimating device 13 is a device for estimating drive torque acting on the load 3 using a rotation position and the moment of inertia of the motor 1. The drive torque estimating device 13 calculates and outputs a drive torque estimation value acting on the load 3.

The observer filter 13 is a device for performing a calculation for filtering of high-frequency components of friction torque. The function of the observer filter 13 is implemented by a lowpass filter. The observer filter 13 is provided to prevent the positioning control system from being excited by high-frequency components of a control voltage or a control signal that is obtained through a conversion for compensating for friction torque that is estimated by the observer having the reaction torque estimating device 10, the command torque estimating device 11, and the drive torque estimating device 12. The observer filter 13 has an amplification coefficient for adjusting a friction torque estimation error.

The arithmetic elements 14 and 15, each of which is a signal computing element, perform addition and subtraction on a reaction torque estimation value, a command torque estimation value, and a drive torque estimation value and outputs a resulting torque estimation value.

A torque estimation value or a signal or data representing a torque estimation value that is output from the arithmetic element 15 as a friction disturbance estimation value calculated by the observers is a voltage corresponding to a torque estimation value produced by the observer filter 13 by filtering, and this voltage is output as a friction compensation voltage $v_o$.

The monitoring section 16 is a section for monitoring friction torque. The servo control apparatus according to the embodiment compares a measured friction torque value with a friction torque threshold value that is determined from motor torque. In other words, the servo control apparatus according to the embodiment has a monitoring function of monitoring compensation torque that is estimated by the observers and judges that the shaft friction has become too high if the compensation torque is higher than the threshold value. Since the servo control apparatus according to the embodiment monitors the shaft friction state on the basis of the result of the friction estimation by the observers, it can judge proper timing for changing or replacing the sealing members etc.

A shaft friction compensating method of the above-configured servo control apparatus according to the embodiment will be described below in detail.

The reaction torque estimating device 10 according to the embodiment estimates the reaction torque $\tau_r$ (N·m) that is exerted on the motor 1 by the load 3 using the moment $J_L$ (kg·m²) of inertia and the spring modulus $K_L$ (kg/rad) of the load 3 as coefficients and using the angle detection value θ as a variable. That is, the reaction torque estimating device 10 functions as a filter which calculates reaction force backward according to a rigid-body-system model. The reaction torque estimating device 10 has a transfer characteristic given by Equation (1a) in which symbol s represents the complex frequency.

[Formula 1]

$$\tau_r = \frac{K_L s^2}{s^2 + 2\xi\omega + \omega^2}\theta, \ \omega = \sqrt{\frac{K_L}{J_L}} \tag{1a}$$

The reaction torque $\tau_r$ is given by Equation (1b) from the equation of motion of rotation.

[Formula 2]

$$\tau_r = \frac{K_L s^2}{s^2 + \omega^2}\theta \tag{1b}$$

Incidentally, where the reaction torque estimating device 10 is configured as an estimating device, the reaction torque may have a very large value if a natural frequency that is determined by the denominator of Equation (1b) approximately coincides with an angle detection value. To decrease this probability, the estimation by the reaction torque estimating device 10 is performed by introducing a coefficient ζ for a first-order term of s. This allows the servo control apparatus according to the embodiment to perform friction estimation without being influenced by the resonance due to the shaft rigidity.

The command torque estimating device 11 according to the embodiment estimates the command torque $\tau_o$ (N·m) that is exerted on the load 3 by the motor 1 using the torque constant $K_t$ (N·m/A), the winding resistance $R_m$ (Ω), and the counterelectromotive force constant $K_b$ (V/rad/s) of the motor 1 as coefficients and using the angle detection value and the motor application voltage v as variables. The command torque estimating device 11 functions as a filter which calculates torque generated by the motor 1 from a motor command voltage in which counterelectromotive force is taken into consideration.

The command torque estimating device 11 has a transfer characteristic given by Equation (2).

[Formula 3]

$$\tau_o = \frac{K_t}{R_m}\left(v - K_b \frac{d\theta}{dt}\right) \quad (2)$$

The drive torque estimating device 12 according to the embodiment estimates the torque $\tau_d$ (N·m) by which the motor 1 drives the load 3 using the moment $J_m$ (kg·m²) of inertia of the motor 1 as a coefficient and using the angle detection value θ as a variable. The drive torque estimating device 12 functions as a filter which calculates, backward, torque acting on the load 3. The drive torque estimating device 12 has a transfer characteristic given by Equation 3.

[Formula 4]

$$\tau_d = J_m \frac{d^2\theta}{dt^2} \quad (3)$$

A relationship of Equation (4) exists between the friction torque $\tau_{obs}$ and the estimated reaction torque $\tau_r$, the command torque $\tau_o$, and the drive torque $\tau_d$, and the friction estimating device 9 can estimate friction torque according to this relationship.

[Formula 5]

$$\tau_{obs} = -\tau_r + \tau_o + \tau_d \quad (4)$$

A control output for compensation of the friction torque $\tau_{obs}$ estimated by Equation (4) is converted into a control voltage corresponding to friction torque by a calculation according to Equation (5). A friction compensation voltage $v_o$ is thus obtained.

[Formula 6]

$$v_o = \tau_{obs} F_{obs}(s) \frac{1}{K_t} R_m \quad (5)$$

In Equation (5), $F_{obs}(s)$ is the characteristic of the observer filter 13 which is given by Equation (6), for example. This characteristic has a time constant $T_c$ of a lowpass filter. The observer filter 13 eliminates high-frequency components from the estimated friction torque $\tau_{obs}$, whereby excitation of the positioning control system is prevented. To adjust the friction torque estimation error, $F_{obs}(s)$ includes an amplification coefficient $K_{obs}$.

[Formula 7]

$$F_{obs} = K_{obs} \frac{1}{T_c s + 1} \quad (6)$$

The servo control apparatus according to the embodiment can perform a positioning control by compensating for friction torque by adding the thus-calculated friction compensation voltage $v_o$ to a positioning control voltage $v_c$ and applying a resulting voltage v to the motor 1.

The same estimation value continues to be obtained for the friction torque $\tau_{obs}$ that is estimated according to the above Equation (4) unless the friction element 20 acting on the motor shaft 2 is replaced by another one. However, the state of the sealing surface varies as the sealing member 25 slidingly contacts the motor shaft 2 repeatedly and such variation with age of the sealing surface may increase the frictional force. However, since the friction estimating device 9 estimates friction torque according to Equation (4), the state of the shaft friction can be monitored by monitoring the estimation value of this friction torque.

Since the friction estimating device 9 is provided which has the disturbance observers for estimating friction disturbance acting on the motor 1, the compensating control for suppressing the shaft friction on the motor shaft 2 can be performed irrespective of the control performance of the angle control section which is restricted by the resonance characteristic of the motor shaft 2. The positioning accuracy and the positioning settlement performance can be improved.

The servo control apparatus according to the embodiment estimates friction disturbance using a value obtained by detecting a rotation position of the motor shaft 2 and a torque command voltage being applied to the motor 1. Therefore, no additional sensor is required and hence the cost can be reduced.

Furthermore, since the disturbance observers for estimating shaft friction torque are provided, the embodiment makes it possible to monitor variation of the shaft friction and the drive shaft friction by monitoring the compensation torque. If an estimated friction torque value is larger than a predetermined threshold value, an ordinary servo control apparatus cannot satisfy a specification of positioning performance even if friction compensation is performed. In contrast, the servo control apparatus according to the invention provides an advantage that it enables judgment as to whether replacement of the sealing members 25 is necessary.

Embodiment 2

The detector 4 according to the first embodiment detects a rotation angle of the motor shaft 2 as a rotation position. In contrast, a detector 4 according to a second embodiment of the invention detects another quantity.

The detector 4 according to the second embodiment of the invention is a detector for detecting an angular velocity θ of rotation of the motor shaft 2.

Furthermore, a control device 6 according to the second embodiment of the invention is for calculating a torque command to be given to the motor 1 on the basis of a command and a signal produced by the detector 4 and functions as an angular velocity control section.

A friction estimating device 9 (disturbance observers) receives two input signals, that is, a motor angular velocity detection value and a motor application voltage. The disturbance observers perform estimation on the basis of the two parameters, that is, the motor speed and the motor application voltage. Therefore, the friction estimating device 9 according to the embodiment estimates a friction value on the basis of the two input signals, that is, the angular velocity detection value θ and the motor application voltage v, outputs a friction compensation voltage $v_o$ on the basis of the estimated friction value, estimates friction disturbance acting around the motor shaft 2 among friction disturbances, and corrects the estimated friction value.

The servo control apparatus according to the second embodiment of the invention is provided with a positioning control loop having the motor 1, the detector 4 which is the angular velocity detector and the control device 6 which is the angular velocity control section as well as the friction estimating device 9 which estimates and corrects friction. Furthermore, the control device 6 and the detector 4 constitute a control system for feeding back the difference between a target value and a detected angular velocity.

The other part of the configuration of the servo control apparatus according to the second embodiment is the same as the corresponding part of the servo control apparatus according to the first embodiment. The servo control apparatus and the shaft friction compensating method according to the second embodiment of the invention can also be applied to the same follow-up camera system as the first embodiment of the invention is directed.

With the above configuration, the control system including the control device 6 which is the angular velocity control device feeds back the difference between a target value and a detected angular velocity θ. The friction estimating device 9 estimates a shaft friction value on the basis of the detected angular velocity θ and a motor application voltage v and outputs a voltage $v_o$ for compensation of shaft friction as a control voltage. An addition circuit 7 adds the control output $v_o$ that is output from the friction estimating device 9 to an angular velocity control output $v_c$ that is output from the control device 6, and a resulting addition voltage v is applied to the motor 1. Therefore, torque that is higher than the friction torque is generated and is used for driving the motor shaft 2. In this manner, the control loop estimates and corrects a friction value and compensates for shaft friction.

A shaft friction compensating method of the above-configured servo control apparatus according to the second embodiment of the invention will be described below in detail.

The reaction torque estimating device 10 according to the embodiment estimates the reaction torque $\tau_r$ (N·m) that is exerted on the motor 1 by the load 3 using the angular velocity detection value θ as a variable. The reaction torque estimating device 10 has a transfer characteristic given by Equation (7).

[Formula 8]

$$\tau_r = \frac{K_L s^2}{s^2 + 2\xi\omega + \omega^2} \int \theta dt, \omega = \sqrt{\frac{K_L}{J_L}} \quad (7)$$

where $J_L$ and $K_L$ are the moment $J_L$ (kg·m²) of inertia and the spring modulus of the load 3, respectively.

The command torque estimating device 11 according to the embodiment estimates the command torque $\tau_o$ (N·m) that is exerted on the load 3 by the motor 1 using the angular velocity detection value θ and the motor application voltage v as variables. The command torque estimating device 11 has a transfer characteristic given by Equation (8).

[Formula 9]

$$\tau_o = \frac{K_t}{R_m}(v - K_b \theta) \quad (8)$$

where $K_t$, $R_m$, and $K_b$ are the torque constant, the winding resistance, and the counterelectromotive force constant of the motor 1, respectively.

The drive torque estimating device 12 according to the embodiment estimates the torque $\tau_d$ (N·m) by which the motor 1 drives the load 3 using the angular velocity detection value θ as a variable. The drive torque estimating device 12 has a transfer characteristic given by Equation 9.

[Formula 10]

$$\tau_d = J_m \frac{d\theta}{dt} \quad (9)$$

where $J_m$ is the moment of inertia of the motor 1.

The friction estimation is realized with either of the angle detection and the speed detection by changing the filter characteristics.

Provided with the disturbance observers for estimating friction disturbance acting on the motor 1, the servo control apparatus according to the second embodiment of the invention can also perform the compensation control for suppressing the shaft friction of the motor shaft 2 irrespective of the control performance of the angular velocity control section (control device 6) which is restricted by the resonance characteristic of the motor shaft 2. The positioning accuracy and the positioning settlement performance can be improved.

The servo control apparatus according to the second embodiment estimates friction disturbance using a value obtained by detecting a rotation speed of the motor shaft 2 and a torque command voltage being applied to the motor 1. Therefore, no additional sensor is required and hence the cost can be reduced.

Furthermore, according to the second embodiment, variation of the shaft friction and the drive shaft friction is monitored by monitoring the compensation torque. Therefore, the second embodiment also enables judgment as to whether replacement of the sealing members 25 is necessary.

(Modifications etc.)

The invention is not limited to the above embodiments themselves. In the practicing stage, the invention can be embodied in such a manner that components are modified without departing from the spirit and scope of the invention. For example, each of the EL rotating unit 23 and the AZ rotating unit 21 may incorporate a gear mechanism.

Various inventions can be made by properly combining plural components disclosed in the above embodiments. For example, several components may be removed from the components of each embodiment. Furthermore, components of the different embodiments may be combined together properly.

The invention can be applied to positioning systems in follow-up camera systems in which a sealing member is attached to a motor shaft to be driven to protect inside electronic devices such as a camera from the environment, such as ITV (industrial television) cameras, camera seekers, and automatic measuring instruments.

In recent years, as for security equipment used in large facilities such as airports and plants and lifeline-related facilities such as power plants and water supplies as well as traffic information supply systems such as ITSs (intelligent transport systems), many systems have come to be marketed which follow a subject using an ITV camera or the like to perform continuous monitoring or acquiring detailed information. The manners of use of these systems are not limited to those for ground installation and various platforms such as vehicles, ships, and airplanes are assumed for them. Suppression of disturbance such as vibration or fluctuations is performed by a small-sized configuration in which vibration-proof performance is taken into consideration. Furthermore, to make it possible to follow plural subjects sequentially, it has become important that the system be increased in swing speed so that it can be directed to each subject in a short time. These systems employ, as a method for allowing the camera direction to follow a subject, a method that a shaft that is attached to a support member of the camera is rotated by using a motor or the like. The camera is directed to a subject by setting the rotation angle of the motor shaft to a desired angle. The invention can be applied to such various kinds of systems.

What is claimed is:

1. A servo control apparatus comprising:
    a motor, receiving an application voltage to drive a drive subject, the motor including a motor shaft, the motor for driving a drive subject;
    a detecting section that detects a rotation position of the motor shaft; and
    a controller configured to generate a motor torque command for the motor using the rotation position;
    wherein the controller includes:
    a reaction torque estimating module configured to estimate reaction torque to be exerted on the motor shaft by the drive subject, by using the rotation position and a moment of inertia of the drive subject;
    a command torque estimating module configured to estimate command torque to be generated around the motor shaft, by using the rotation position and an application voltage on the motor;
    a drive torque estimating module configured to estimate drive torque to act on the drive subject, by using the rotation position and a moment of inertia of the motor;
    a disturbance observer configured to estimate friction torque occurring in the vicinity of the motor shaft on the basis of the estimated reaction torque, the estimated command torque and the estimated drive torque; and
    the disturbance observer is configured to generate a compensation voltage to be added to the application voltage on the basis of the friction torque.

2. The servo control apparatus according to claim 1, wherein the disturbance observer comprises a monitoring section configured to monitor the friction torque.

3. The servo control apparatus according to claim 1, wherein the disturbance observer generates the compensation voltage by performing a calculation of filtering high-frequency components of the friction torque.

4. The servo control apparatus according to claim 1, wherein the reaction torque estimating module is configured to estimate the reaction torque $\tau_y$ (N·m) by the following formula (1a)

$$\tau_r = \frac{K_L s^2}{s^2 + 2\xi\omega + \omega^2}\theta, \ \omega = \sqrt{\frac{K_L}{J_L}} \tag{1a}$$

where $J_L$ (kg·m$^2$) is the moment of inertia of the drive subject, $K_L$ (kg/rad) is a spring modulus of the drive subject, and s represents a complex frequency.

5. The servo control apparatus according to claim 1, wherein the command torque estimating module is configured to estimate the command torque $\tau_o$ (N·m) by the following formula (2):

$$\tau_o = \frac{K_t}{K_m}\left(v - K_b - \frac{d\theta}{dt}\right) \tag{2}$$

where $K_t$ (N·m/A) is a torque constant of the motor, $R_m$ (Ω) is a winding resistance of the motor, and $K_b$ (V/rad/s) is a counter-electromotive force constant.

6. The servo control apparatus according to claim 1, wherein the drive torque estimating module is configured to estimate the drive torque $\tau_d$ (N·m) by the following formula (3):

$$\tau_d = J_m \frac{d^2\theta}{dt^2} \tag{3}$$

where $J_m$ (kg·m$^2$) is the moment of inertia of the motor.

7. A servo control apparatus comprising:
    a motor, receiving an application voltage to drive a drive subject, the motor including a motor shaft, the motor for driving a drive subject;
    a detecting section that detects a rotation speed of the motor shaft; and
    a controller configured to generate a motor torque command for the motor using the rotation speed;
    wherein the controller includes:
    a reaction torque estimating module configured to estimate reaction torque to be exerted on the motor shaft by the drive subject, by using the rotation speed and a moment of inertia of the drive subject;
    a command torque estimating module configured to estimate command torque to be generated around the motor shaft, by using the rotation speed and an application voltage on the motor;
    a drive torque estimating module configured to estimate drive torque to act on the drive subject, by using the rotation speed and a moment of inertia of the motor;
    a disturbance observer configured to estimate friction torque occurring in the vicinity of the motor shaft on the basis of the estimated reaction torque, the estimated command torque and the estimated drive torque; and
    the disturbance observer is configured to generate a compensation voltage to be added to the application voltage on the basis of the friction torque.

8. The servo control apparatus according to claim 7, wherein the disturbance observer comprises a monitoring section configured to monitor the friction torque.

9. The servo control apparatus according to claim 7, wherein the disturbance observer generates the compensation voltage by performing a calculation of filtering high-frequency components of the friction torque.

10. The servo control apparatus according to claim 7, wherein the reaction torque estimating module is configured to estimate the reaction torque $\tau_y$ (N·m) by the following formula (1a):

$$\tau_r = \frac{K_L s^2}{s^2 + 2\xi\omega + \omega^2}\theta, \ \omega = \sqrt{\frac{K_L}{J_L}} \tag{1a}$$

where $J_L$ (kg·m$^2$) is the moment of inertia of the drive subject, $K_L$ (kg/rad) is a spring modulus of the drive subject, and s represents a complex frequency.

11. The servo control apparatus according to claim 7, wherein the command torque estimating module is configured to estimate the command torque $\tau_o$ (N·m) by the following formula (2):

$$\tau_o = \frac{K_t}{R_m}\left(v - K_b \frac{d\theta}{dt}\right) \quad (2)$$

where $K_t$ (N·m/A) is a torque constant of the motor, $R_m$ (Ω) is a winding resistance of the motor, and $K_b$ (V/rad/s) is a counter-electromotive force constant.

12. The servo control apparatus according to claim 7, wherein the drive torque estimating module is configured to estimate the drive torque $\tau_d$ (N·m) by the following formula (3):

$$\tau_d = J_m \frac{d^2\theta}{dt^2} \quad (3)$$

where $J_m$ (kg·m$^2$) is the moment of inertia of the motor.

* * * * *